J. COPP.
TIRE PROTECTOR.
APPLICATION FILED JAN. 12, 1920.
1,362,475.
Patented Dec. 14, 1920.
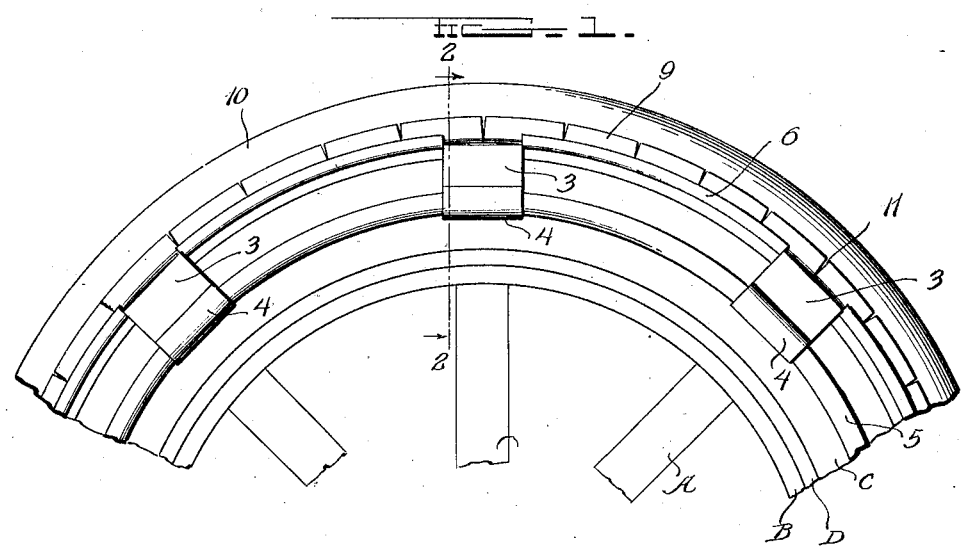
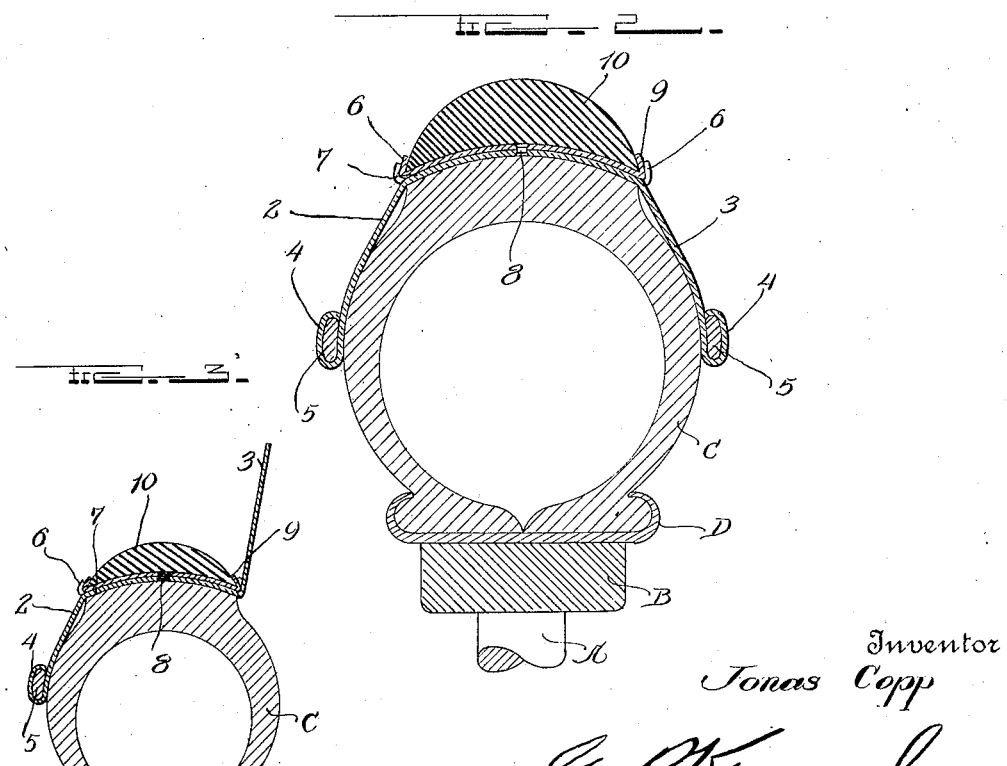
Inventor
Jonas Copp
By Geo. P. Kimmel.
Attorney

UNITED STATES PATENT OFFICE.

JONAS COPP, OF MIAMI, ARIZONA, ASSIGNOR OF ONE-HALF TO HAROLD COPP, OF MIAMI, ARIZONA.

TIRE-PROTECTOR.

1,362,475.   Specification of Letters Patent.   Patented Dec. 14, 1920.

Application filed January 12, 1920. Serial No. 350,778.

*To all whom it may concern:*

Be it known that I, JONAS COPP, a citizen of the United States, residing at Miami, in the county of Gila and State of Arizona, have invented certain new and useful Improvements in Tire-Protectors, of which the following is a specification.

This invention relates to protectors for pneumatic vehicle tires.

The principal objects of the invention are; to provide a protector for pneumatic tires which will positively prevent puncture of the tire through contact with glass, nails or other sharp objects; to provide a protector which will in no way reduce the resiliency of the tire; and to provide a protector which will prevent chafing or tearing of the tire due to "side-swiping" the curbs of streets or large stones.

Furthermore the invention provides a tire protector which is positively locked upon the tire to prevent accidental dislodgment or disengagement thereof and which is very simply constructed, very efficient in operation and durable in nature.

With these objects in view and others which will appear as the nature of the invention is better understood, the invention comprises various novel features of construction and arrangement of parts, which will be more fully described hereinafter and set forth with particularity in the claims appended hereunto.

In the drawing:

Figure 1 is a side elevation of a portion of a vehicle wheel upon the tire of which the present protector is mounted, and Fig. 2 is a view on the line 2—2 of Fig. 1, and Fig. 3 is a reduced transverse view of the protector before it is applied to a vehicle tire.

In the drawings wherein like characters of reference indicate like or similar parts throughout the several views:—

A designates the spokes of a vehicle wheel and B the wheel rim upon which is mounted the usual pneumatic tire C through the medium of a suitable detachable rim D, all of which are of conventional type and are shown merely by way of illustration.

The tire protector which forms the substance of the present invention comprises an annular base member, 1 which is disposed circumferentially about the tread of the tire as is clearly shown in Fig. 1 and which is cross-sectionally arcuate in configuration to conform to the curvature of the tire tread. At spaced intervals about the edges of the band are arms 2 and 3 which when the device is placed on a tire extend downwardly and grip against the sides thereof as illustrated in Fig. 2. The terminals of the arms are bent as at 4 about annular cross-sectionally oval rings 5 for securely holding the device upon a tire and preventing "side swiping" against curbs or stones. Between the arms 2 and 3 the edges of the band 1 are bent upwardly as at 6 and engage a second annular band 7 which is riveted as at 8 or otherwise secured to the base band 1 and has its edges 9 bent upwardly and inwardly to engage about the edges of a solid resilient auxiliary tire 10 which is formed preferably semi-cylindrical in cross section with a concave inner face as shown in Fig. 2. The upwardly bent edges 9 are split as at 11 to form attaching fingers for engaging tire 10.

The arms 3 are normally bent to lie in a plane at an angle to the plane band 1 as illustrated in Fig. 3 with one of the arms 3 in this position, so that the protector may be slid over a tire and when such has been done the arms 3 are bent down and the rings 5 inserted in the heads 4 which are subsequently closed thus holding the device securely upon the tire.

Obviously puncturing the tread of the tire will be impossible with this protector applied and furthermore side swiping will be prevented on account of the arms 2 and 3 and rings 5 which protect the side of the tire.

From the foregoing description taken in connection with the accompanying drawings it is thought that a clear and comprehensive understanding of the construction, operation and advantages of the invention will be had, but while I have shown and described the device as embodying a specific structure, I desire it to be understood that such changes may be made in said structure as do not depart from the spirit and scope of the invention as claimed.

What I claim is:

1. A tire protector comprising an annular tread encircling band of sheet metal arcuate in cross section, said band having circumferentially spaced arms extending from its side edges and adapted to project downward and grip the sides of a tire when applied, means for securing said arms in operative position and an auxiliary solid resilient tread element carried by said band.

2. A tire protector comprising an annular tread encircling band of sheet metal arcuate in cross section, said band having circumferentially spaced arms extending from its side edges and adapted to project downward and grip the sides of a tire when applied, means for securing said arms in operative position, said band having outturned lips between said arms, and an auxiliary solid resilient tread element mounted on the band and held by said lips.

3. A tire protector comprising an annular tread encircling band of sheet metal arcuate in cross section, said band having circumferentially spaced arms extending from its side edges and adapted to project downward and grip the sides of a tire when applied, means for securing said arms in operative position, said band having outturned lips, between said arms, a supplemental band superposed on said first mentioned band and conforming in shape and fixed thereto, said supplemental band having outturned attaching fingers at its side edges, and an auxiliary solid resilient tread element carried by said band.

In testimony whereof, I affix my signature hereto.

JONAS COPP.